United States Patent [19]
Kitajima

[11] Patent Number: 5,109,249
[45] Date of Patent: Apr. 28, 1992

[54] CAMERA WITH A FUNCTION OF PREVENTING A HAND MOVING BLUR

[75] Inventor: Tatsutoshi Kitajima, Kodaira, Japan

[73] Assignee: Ricoh Company, Ltd., Tokyo, Japan

[21] Appl. No.: 593,968

[22] Filed: Oct. 9, 1990

[30] Foreign Application Priority Data

Oct. 12, 1989 [JP] Japan .............. 1-119346[U]
Feb. 6, 1990 [JP] Japan .................. 2-26295
Feb. 10, 1990 [JP] Japan .................. 2-30271
Jun. 12, 1990 [JP] Japan ................. 2-151579

[51] Int. Cl.$^5$ ............................................. G03B 7/08
[52] U.S. Cl. ........................ 354/430; 354/456; 358/222; 359/554
[58] Field of Search ........... 354/430, 456, 268, 237, 354/238.1, 267.1, 70, 75, 76, 289.1, 289.12, 224; 358/222, 105; 350/500; 359/554

[56] References Cited

U.S. PATENT DOCUMENTS

| | | | |
|---|---|---|---|
| 3,690,234 | 9/1972 | Costianes | 354/430 |
| 4,448,510 | 5/1984 | Murakoshi | 354/289.12 |
| 4,922,281 | 5/1990 | Kitajima | 354/404 |

FOREIGN PATENT DOCUMENTS 63-53526 3/1988 Japan .
63-53531 3/1988 Japan .

*Primary Examiner*—W. B. Perkey
*Assistant Examiner*—Cassandra C. Spyrou
*Attorney, Agent, or Firm*—Oblon, Spivak, McClelland, Maier & Neustadt

[57] ABSTRACT

A camera that is equipped with a function of preventing a blurring of a picture caused by a hand movement of the camera operator. The camera comprises a first detector which detects a moving speed of the camera caused by a hand movement of the camera operator. An image moving speed on a film surface is then calculated on the basis of the moving speed detected by the first detector. A second detector detects a peak speed of the calculated image moving speed and a time of the peak speed. A presumptive image moving speed and a presumptive image moving quantity after the time of detecting the peak speed are then calculated on the basis of the peak speed and the time of the speak speed. In this way, the camera can function to control an exposure time and prevent a picture from blurring due to a hand movement by the camera operator, while still providing a camera which is small in size and simple in construction.

13 Claims, 9 Drawing Sheets

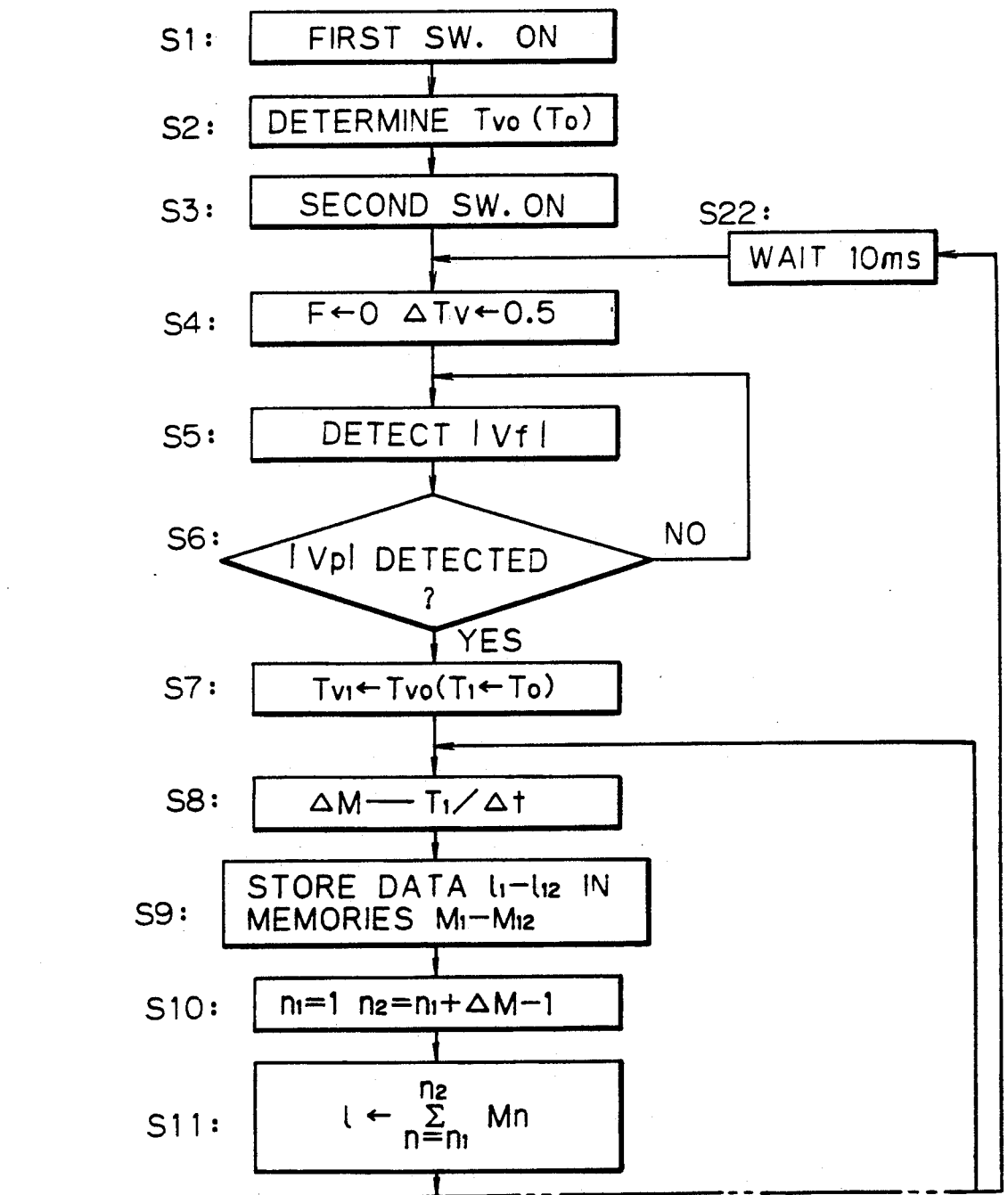

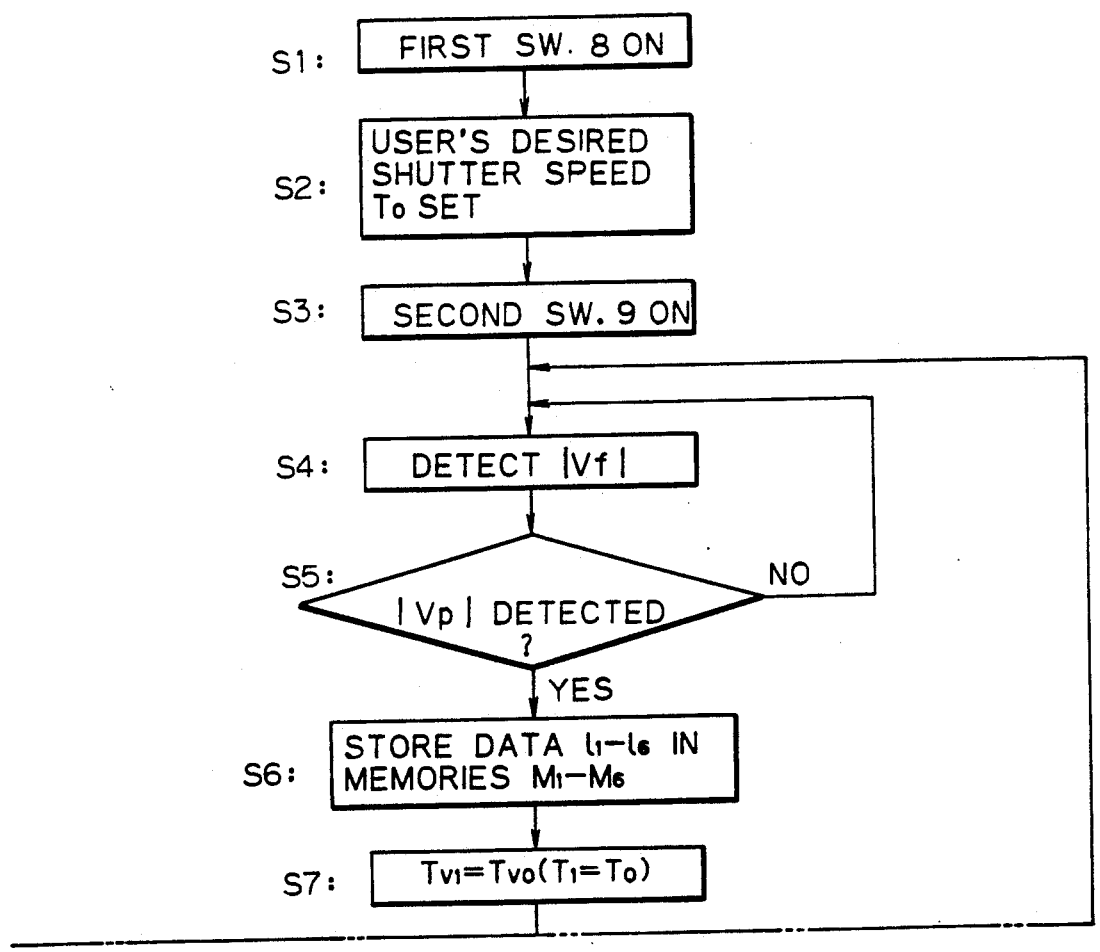

CAMERA WITH A FUNCTION OF PREVENTING A HAND MOVING BLUR

BACKGROUND OF THE INVENTION

1. Field of the Invention

The present invention relates to a camera with a function of preventing a hand moving blur. More particularly, the invention relates to a camera with a function of preventing a hand moving blur of a picture caused by movement of the camera which the function appropriately and reliably prevents such blur on the condition that the camera sets the shutter speed which is as close as possible to that which the user wants.

Note that the term "shutter speed" means the time period when the shutter is being opened.

2. Description of the Related Art

One of the techniques to prevent blurring of the picture caused by movement of the camera is to control the starting point of exposure (timing of exposure). Such a hand movement blur prevention mechanism is disclosed in, for example, Japanese Patent Application Laying Open (KOKAI) No. 63-53531.

The proposed technique disclosed in the publication is to prevent the blurring of images on the film surface by such a way that the speed of movement of the camera is detected to determine a peak value of the movement from the detection signal and that the exposure is started at the time around the timing of the peak of the movement.

On the other hand, Japanese Patent Application Laying Open (KOKAI) No. 53526 discloses another technique to prevent blurring of a picture caused by hand movement.

The second technique is to prevent the blurring of the picture on the condition that the picture is taken at a shutter timing which is set to be as close as possible to that which the user intends to set.

More precisely, according to the second technique, the blurring is prevented by such a way that the movement amount of the camera at the time of releasing the shutter is detected with the use of a plurality of acceleration sensors that the camera is equipped with and that a shutter speed which is as close as possible to that which the user wants is set on the basis of the detected movement amount of the camera.

That is, first, four acceleration sensors are disposed at two vertically separated two points and two horizontally separated points in the camera, respectively, each sensitive axis of the sensor being parallel to the optical axis of the camera lens or perpendicular to the optical axis.

On the other hand, the measurement reference time necessary for detecting the movement amount of the camera is set immediately before releasing the shutter. The reference time is divided into a plurality of detection time periods in series according to the time unit corresponding to a desired shutter speed so that the movement amount of the camera is detected in each of the detection time periods.

After that, the difference between the maximum peak of the camera movement amount and the minimum peak amount thereof is calculated. The calculation result is used as the probability base to determine the presumptive speed of the image movement on the film surface.

On the basis of the presumptive speed of the image movement, the shutter speed is determined by trial and error, shutter speed being as close as possible to the desired speed and at the shutter speed the image movement speed on the film surface being within the allowable range.

It is desirable that the starting timing of exposure be set so that the peak point of the hand movement is coincident with the central point of the exposure time period. Under this condition, it is proposed to prevent blurring caused by hand movement by controlling the starting point of exposure at the desired shutter speed.

For example, above-mentioned Japanese Patent Application Laying Open (KOKAI) No. 63-53531 discloses a technique in which a differential circuit or an integration circuit is used in conjuction with a phase shift filter to realize the above-mentioned condition.

However, since the speed of the camera movement and the corresponding shutter speed vary, the technique of the publication mentioned above can not completely prevent blurring in some conditions of the speed of the camera movement.

On the other hand, compact cameras equipped with a large magnification lens having a focal length of more than 100 mm are widely used. When taking a picture using a large magnification lens, if the user is inexperienced, the picture is often blurred due to the hand movement at the shutter speed of 1/30 to 1/125 sec. since the F-number of the lens becomes large, i.e., the lens becomes dark.

Therefore, it is required to realize a means for reliably preventing the blurring of the picture caused by hand movement at a shutter speed of 1/30 to 1/125 in particular.

The inventors of the present invention found out through experiments that the blurring of image on the film surface occurs incidentally and the extent of that is not constant.

The inventors also found out that when a picture is taken by a camera held by hands, the image on the film surface vibrates at a low frequency less than 2 Hz or a frequency of about 10 Hz with amplitude being not constant.

The inventors further confirmed that the blurring appearing on the picture was mainly caused by the vibration of 10 Hz due to the tremble of fingers at the time of releasing the shutter.

Therefore, it is necessary to suppress the image movement speed due to the vibration of 10 Hz so that the speed is kept within an allowable range.

This means that the blurring of the picture caused by hand movement can not essentially be avoided by the technique of the prior art mentioned above in which the presumptive speed of image on the film surface is determined from the hand movement speed at the time immediately before exposure so as to control and to minimize the blurring on the basis of the presumptive speed.

Also, with regard to the structure comprising a differential circuit or an integration circuit in conjuction with a phase shift filter as disclosed in Japanese Patent Application Laying Open (KOKAI) No. 63-53531, the construction of the camera becomes complicated and disadvantageous to realize a compact multi-functional camera.

Therefore, it is required to realize a camera which is simple in construction and equipped with a mechanism which reliably prevents the blurring of picture caused by hand movement.

SUMMARY OF THE INVENTION

The present invention was made considering the above-mentioned points.

It is therefore an object of the present invention to provide a camera with a function of preventing a hand moving blur of picture caused by hand movement in which the function is simple in construction and effectively and reliably prevents the blur considering the user's intention.

Another object of the present invention is to provide a camera with a function of preventing a hand moving blur of picture caused by hand movement in which the function effectively and reliably prevents the blur by such a way that an appropriate exposure starting timing is determined to reduce the image movement quantity essentially on the basis of the photographing condition, especially the exposure starting timing and the shutter speed, which the user intends to set and that if the image moving quantity at the determined exposure starting timing is greater than the allowable limit, the shutter speed is changed.

The object of the present invention can be achieved by a first camera with a function of preventing a hand moving blur comprising a first detecting means attached to a camera body for detecting a hand moving speed of the camera, a first calculating means for calculating an image moving speed on a film surface on the basis of the hand moving speed detected by the first detecting means, a second detecting means for detecting a peak speed of the image moving speed calculated by the first calculating means and a time of the peak speed, and a second calculating means for calculating a presumptive image moving speed and a presumptive image moving quantity after the time of detecting the peak speed on the basis of the peak speed and the time of the peak speed.

An advantage of the first camera of the present invention is that an image moving speed and an image moving quantity are presumed by values of a peak speed of the image moving speed and a time of the peak speed on the basis of a periodicity of an image moving speed, so that the presumed image moving speed and the presumed image moving quantity are respectively substantially identical with an actual image moving speed and an actual image moving quantity, accordingly a photograph without a hand moving blurr is taken by using the presumed image moving speed and the presumed image moving quantity.

Another object of the present invention can be achieved by a second camera with a function of preventing a hand moving blur comprising a first detecting means attached to a camera body for detecting a hand moving speed of the camera, a first calculating means for calculating an image moving speed on a film surface on the basis of the hand moving speed detected by the first detecting means, a second detecting means for detecting a peak speed of the image moving speed calculated by the first calculating means and a time of the peak speed, a second calculating means for calculating a presumptive image moving speed and a presumptive image moving quantity after the time of detecting the peak speed on the basis of the peak speed and the time of the peak speed, a comparing means for comparing the presumptive image moving quantity on a predetermined exposure period with a predetermined allowable image moving quantity, and a deciding means for deciding to change the exposure period in a case where the presumptive image moving quantity is greater than the allowable image moving quantity, the deciding means being adapted to shift in order an exposure starting timing on a period after the time of the peak speed in such a manner that the presumptive image moving quanity of the shifted exposure period become not greater than a predetermined allowable image moving quantity.

An advantage of the second camera of the present invention is that it becomes possible to obviate or minimize the blur of picture under photographing conditions as close as possible to that which the user intends to set, due to the arrangement to prevent the blur by such a way that prior to taking a photo, the presumptive image moving quantity is calculated and compared with the predetermined allowable image moving quantity so that when the presumptive quantity is not greater than the allowable quantity, the photographing is carried out under the calculated condition, whereas when the presumptive quantity is greater than the allowable quantity, the shutter timing is changed to the exposure period in which the presumptive image moving quantity becomes small.

Another object of the present invention can be further achieved by a third camera with a function of preventing a hand moving blur, comprising a first detecting means attached to a camera body for detecting a hand moving speed of the camera, a first calculating means for calculating an image moving speed on a film surface on the basis of the hand moving speed detected by the first detecting means, a second detecting means for detecting a peak speed of the image moving speed calculated by the first calculating means and a time of the peak speed, a second calculating means for calculating a presumptive image moving speed and a presumptive image moving quantity after the time of detecting the peak speed on the basis of the peak speed and the time of the peak speed, a comprising means for comparing the presumptive image moving quantity on a predetermined exposure period with a predetermined allowable image moving quantity, and a deciding means for deciding to shorten a shutter speed in a case where the presumptive image moving quantity is greater than the allowable image moving quantity.

An advantage of the third camera of the present invention is that it becomes possible to take a photo at the shutter speed as close as possible to that which the user intends to set within the range wherein the image moving quantity doesn't matter, due to the arrangement to be able to prevent the blur by such a way that when the presumptive image moving quantity is greater than the allowable image moving quantity even if the exposure starting timing is shifted to a predetermined exposure starting timing within the exposure period of a quarter of the cycle, the shutter speed is shortened so that, under the condition of the shortened shutter speed, the image movement is discriminated so that the exposure is conducted only when the image moving quantity is not greater than the allowable image moving quantity.

Another object of the present invention can be still further achieved by a fourth camera with a function of preventing a hand moving blur comprising a first detecting means attached to a camera body for detecting a hand moving speed of the camera, a first calculating means for calculating an image moving speed on a film surface on the basis of the hand moving speed detected by the first detecting means, a second detecting means for detecting a peak speed of the image moving speed calculated by the first calculating means and a time of the peak speed, a second calculating means for calculating a presumptive image moving speed and a presumptive image moving quantity after the time of detecting the peak speed on the basis of the peak speed and the time of the peak speed, and a deciding means for calculating a zero point on which the image moving speed becomes zero and for deciding an exposure starting timing in such a manner that the zero point coincides with a central point of the predetermined exposure period, the deciding means being adapted to shorten a set shutter speed or prohibit a shutter from releasing in a case where the peak speed is greater than the predetermined allowable image moving speed.

An advantage of the fourth camera of the present invention is that it becomes possible to provide a camera which is simple in structure and effectively and reliably avoids blur caused by hand movement by driving the shutter in a short time according to the user's intention in essence, due to the arrangement to prevent the blur by such a way that the exposure range is arranged in a range where the image moving speed is relatively small and that the image moving speed quantity is predicted prior to photographing and when the presumptive quantity is considered as greater than the allowable quantity, either the shutter speed is shifted to the high speed side or exposure is prohibited.

Further objects and advantages of the present invention will be apparent from the following description of the preferred embodiments of the invention as illustrated in the accompanying drawings.

DESCRIPTION OF THE PREFERRED EMBODIMENTS

A principle function of the present invention is described first prior to the explanation of the embodiments of the camera equipped with a mechanism for preventing blur of picture caused by hand movement in accordance with the present invention.

The inventors found out by their research and experiments that with regard to a vibration of around 10 Hz which causes an image blurring to rise and have an inconstant amplitude, in the event that the time period from the peak point of the amplitude (or speed) of the vibration to the zero point of the amplitude in a quarter of one cycle is short as, for example, around 25 ms, it becomes possible to concretely define the change of the image movement speed in each quarter period of the cycle after the peak generation point on the basis of the peak value of the amplitude and the timing point of the peak.

It is very effective to utilize the research result to provide a camera equipped with a mechanism for preventing blur of picture caused by hand movement particularly at a shutter speed of 1/30 to 1/125 sec. This is because that each quarter cycle after the peak point of the amplitude of the 10 Hz vibration is 25 ms which corresponds to the shutter speed of 1/30 sec (33 ms), which is convenient for calculation about exposure in an apex system and that it is possible to detect the peak value and the generation timing point of the peak and analyze the speed change of the image movement in each quarter cycle after the peak point.

Figure 3:
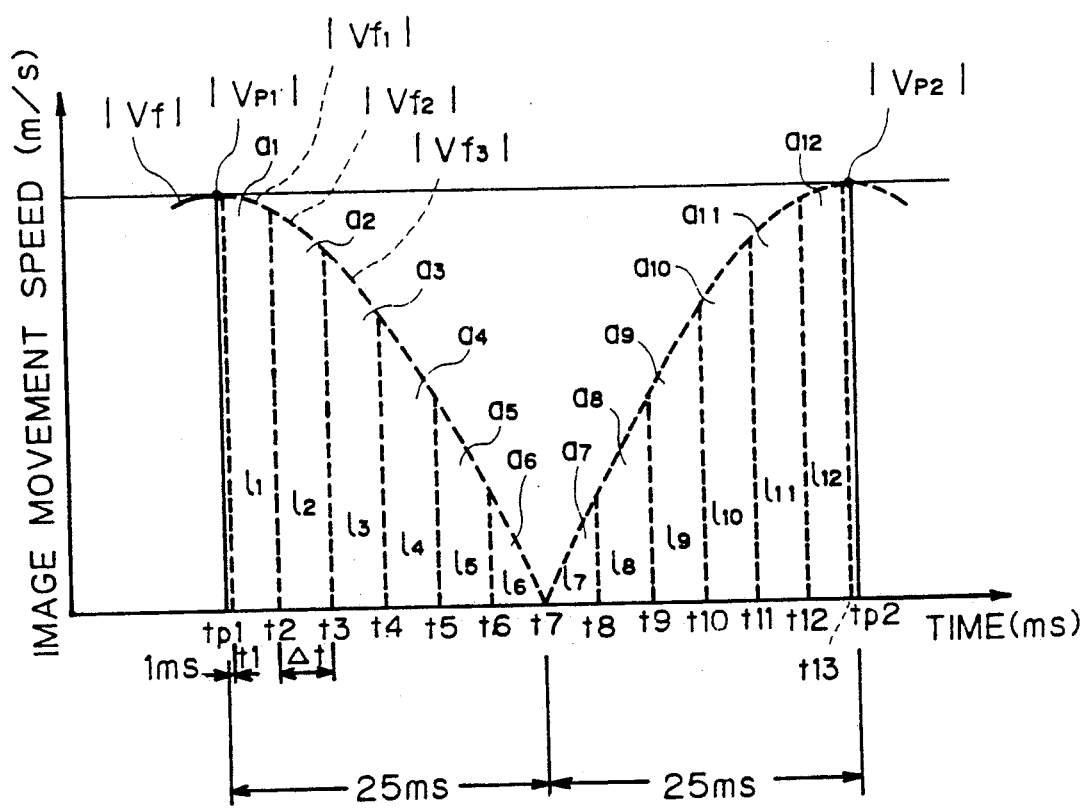
FIG. 3 is an explanatory view for explaining the principle of the function in accordance with the present invention.

Therefore, first, in accordance with the present invention, the change of the image movement speed which causes the hand movement blurring is assumed as a model, for example, as represented in FIG. 3. The model vibration represented in FIG. 3 is a single vibration of 10 Hz frequency and the amplitude thereof is inconstant. The change of the image movement speed $|V_f|$ of the model vibration is regarded as the presumptive image movement speed change on the film surface.

Second, on the basis of the peak points in the shutter release operation with the image movement speed $|V_f|$ of the model vibration, a plurality of unit ranges $a_1$ to $a_{12}$ are arranged in time series by dividing a period of half cycle from one peak point $tp_1$ through a zero point $t_7$ to the next peak point $tp_2$ to by a predetermined minute time width $\Delta t$.

As illustrated in FIG. 3, for example, the division start point $t_1$ is set at the timing 1 ms after the point $tp_1$ of the first peak value $|V_{p1}|$ of the image movement speed $|V_f|$ of the model vibration. The time period from the point $t_1$ to the point $t_{13}$ immediately before the peak point $tp_2$ of the second peak value $|V_{p2}|$ is divided by a predetermined time width $\Delta t = 4$ ms to set twelve time unit ranges $a_1$ to $a_{12}$ in time series.

Six ranges $a_1$ to $a_6$ are formed in the first half period before the zero point $t_7$ and the other six ranges $a_7$ to $a_{12}$ are formed in the latter half period after the zero point $t_7$.

The average speed of the image movement in each of the twelve ranges $a_1$ to $a_{12}$ or image movement amounts $l_1$ to $l_{12}$ of the unit ranges $a_1$ to $a_{12}$, respectively, are presumptively calculated and determined from the equations described later. Each calculated presumptive value is a function of the peak value $|V_{p1}|$ of the image movement speed $|V_f|$. Each of the image movement amounts $l_1$ to $l_{12}$ is obtained by multiplying the average speed in each range by the predetermined time width $\Delta t = 4$ ms.

More precisely, each of the presumptive image movement amounts $l_1$ to $l_6$ in the six unit ranges $a_1$ to $a_6$ of the first half time period is calculated as a function of the peak value $|V_{p1}|$, as mentioned above, and memorized in each of memory addresses $M_1$ to $M_6$ of a register means for registering the presumptive image movement amount. It is to be noted that M represents the number of memory addresses in the period of a quarter cycle or number of the quarter cycles.

On the other hand, with regard to the presumptive image movement amounts $l_7$ to $l_{12}$ in the six unit ranges $a_7$ to $a_{12}$ of the latter half time period, since the image movement speed $|V_f|$ is supposed to be symmetrical with respect to the zero point $t_7$, the presumptive amounts $l_7$ to $l_{12}$ are obtained from the memory addresses $M_1$ to $M_6$ and arranged in reverse order as represented in Table-1 described later, instead of specially calculating the amounts. The value read from the memory addresses $M_1$ to $M_6$ in reverse order are registered in the memory addresses $M_7$ to $M_{12}$, respectively.

It is to be noted that $M_1$ designates the first memory address to be used for predicting the image movement in the exposure operation.

In accordance with an embodiment of the present invention, the first unit range $a_1$ starting from the timing $t_1$ which is 1 ms after the peak point $t_{p1}$ is used as the exposure start range $n_1$ which is the timing to start exposure by opening the shutter ($n_1 = 1$). The reason for setting the timing $t_1$ as the starting point of exposure is that the timing $t_1$ comes shortly after the shutter release operation and therefore the timing is the point closest to the user's intention of shutter timing.

However, it is to be noted that the exposure start range is not limited to the first range $n_1 = 1$. When the presumptive image movement amount l throughout the entire exposure period is larger than the allowable amount, the exposure start range is repeatedly shifted to the retard side one by one until the total amount l becomes smaller than the allowable amount.

However, in the above-mentioned shifting procedure, when the exposure start range $n_1$ comes to satisfy the following equation (1), the shifting procedure is stopped.

$$n_1 = M - (\Delta M/2) \quad (1)$$

In the above equation (1), M represents the number of unit ranges included in the period of quarter cycle which number is obtained by dividing the period of quarter cycle by the predetermined time width $\Delta t$ which is, in this particular embodiment, 4 ms. Also, $\Delta M$ represents the number of exposure ranges obtained by dividing the shutter speed ($T_o$) by the predetermined time width $\Delta t$, i.e., ($T_o/\Delta t$) which means the number of necessary memory required for determining the presumptive image movement amount on the condition that the shutter speed is ($T_o$).

The reason for stopping the shifting procedure when the equation (1) is satisfied is that if the exposure start range $n_1$ is shifted to a larger number than $M - (\Delta M/2)$, the exposure range (the number of exposure ranges $\Delta M$) is reversely shifted to the side where the image movement speed $|V_f|$ is fast from the side where the speed is slow.

In accordance with the principle of the present invention mentioned above, when the shutter speed ($T_o$) is, for example, 16 ms (which corresponds to 1/60 sec), the other factors are as follows.

M is 6 and $\Delta t$ is 4 ms as mentioned above.

$$\Delta M = 16ms/4ms = 4$$

$$n_1 = M - \Delta M/2 = 4$$

Therefore, in FIG. 3, since the initial exposure start range $n_1$ is the unit range $a_1$ and the exposure starting point is $t_1$, the total image movement amount l in the exposure period from $a_1$ to $a_4$ in this particular example is represented as follows.

$$l = \sum_{n=1}^{4} M_n = l_1 + l_2 + l_3 + l_4$$

When the amount l is discriminated as being larger than the allowable amount, the exposure start range is shifted one by one until the amount l becomes equal to or smaller than the allowable amount.

However, in the event that the amount l is still larger than the allowable amount even when the range is shifted beyond the range $a_4$ to the side where the image movement speed is slower, the exposure start timing is set at the point $t_4$, that is the exposure start timing of the critical range $n_1$, since the amount l is not reduced by shifting the range any further.

The calculation principle of the presumptive image movement amount l is described below.

As mentioned above, either the image movement speed in each of six unit ranges $a_1$ to $a_6$ of the quarter cycle period or the image movement amounts $l_1$ to $l_6$ of the unit ranges $a_1$ to $a_6$, each amount being obtained by multiplying the image speed by a predetermined time width $\Delta t$, are calculated and represented as a function of the peak value $|V_{p1}|$ of the image speed $|V_f|$ on the basis of the formulas represented in Table-1 described later. The calculated results are registered in the memory addresses $M_1$ to $M_6$, respectively.

It is to be noted that, as mentioned before, the presumptive image movement amounts $l_7$ to $l_{12}$ of the latter ranges after the point $t_7$ are determined to be the same value as the amounts $l_6$ to $l_1$, respectively, since the absolute value of the speed $|V_f|$ is supposed to be almost symmetrical with respect to the zero point $t_7$. Therefore, the amounts $l_7$ to $l_{12}$ are obtained, without calculation, by reading the amounts $l_1$ to $l_6$ from the memory addresses $M_1$ to $M_6$ and rearranging them in reverse order and registered in memory addresses $M_7$ to $M_{12}$, respectively.

TABLE 1

| Movement amount | Calculation formula for movement amount | Memory address |
| --- | --- | --- |
| $l_1$ | $0.0039 \, |V_{p1}| \, (m)$ | $M_1$ |
| $l_2$ | $0.0036 \, |V_{p1}| \, (m)$ | $M_2$ |
| $l_3$ | $0.0031 \, |V_{p1}| \, (m)$ | $M_3$ |
| $l_4$ | $0.0024 \, |V_{p1}| \, (m)$ | $M_4$ |
| $l_5$ | $0.0015 \, |V_{p1}| \, (m)$ | $M_5$ |
| $l_6$ | $0.0005 \, |V_{p1}| \, (m)$ | $M_6$ |
| $l_7$ | $(0.0005 \, |V_{p1}| \, (m))$ | $M_7$ |
| $l_8$ | $(0.0015 \, |V_{p1}| \, (m))$ | $M_8$ |
| $l_9$ | $(0.0024 \, |V_{p1}| \, (m))$ | $M_9$ |
| $l_{10}$ | $(0.0031 \, |V_{p1}| \, (m))$ | $M_{10}$ |
| $l_{11}$ | $(0.0036 \, |V_{p1}| \, (m))$ | $M_{11}$ |
| $l_{12}$ | $(0.0039 \, |V_{p1}| \, (m))$ | $M_{12}$ |

The formula for calculating the amount of image movement represented in the table, for example, the formula for calculating the amount $l_1$ of the first unit range $a_1$ is derived as follows.

$$I_1 = |V_{p1}| \int_{t_1}^{t_2} \cos\left(\frac{2\pi t}{100 \times 10^{-3}}\right) \cdot dt$$

$$= 0.061 |V_{p1}| [\sin 62.83 t]_{0.001}^{0.005}$$

$$= 0.0039 |V_{p1}| (m)$$

It is to be noted that the above mentioned formula is applicable to the peak values other than the first peak value $|V_{p1}|$. Therefore, the value $|V_{p1}|$ can be replaced by $|V_p|$.

The total image movement amount l is different depending on the exposure period corresponding to the shutter speed $T_o$. The amount l is represented in general by the following equation (2).

$$l = \sum_{n=n_1}^{n_2} l_n \tag{2}$$

In the above equation (2), $n_2$ represents the exposure end range which is derived from the following equation (3).

$$n_2 = n_1 + \Delta M - 1 \tag{3}$$

It is to be noted that, as mentioned before, if the amount l does not become smaller than the allowable amount after shifting the exposure start range $n_1$ to the predetermined unit range, the shutter speed is shifted to the high speed side by every predetermined step, which is 0.5 step in this particular example. After every shifting procedure, the amount l is compared with the allowable amount. If the amount l does not become smaller than the allowable amount after a predetermined number times of the shifting procedure, for example three times of the shifting procedure in this particular example, the shifting procedure is ended and the speed $|V_f|$ is detected again after a predetermined time so as to repeat the similar procedure on the basis of the redetected speed $|V_f|$.

In accordance with the above-mentioned principle of the present invention, it becomes possible to minimize the image movement due to the hand movement and prevent the blur of picture.

On the other hand, in accordance with another example of the mechanism for preventing the blur of picture caused by hand movement, the exposure start timing by opening the shutter, that is the range $n_1$ at which the exposure process is started is determined by the following equation (4).

$$n_1 = M - \Delta M + 1 \tag{4}$$

By determining the range $n_1$ on the basis of the equation (4), it becomes possible to end the exposure process at the timing of zero point $t_7$ in the event that the $\Delta M$ is smaller than the number M of the quarter cycle periods, which makes it possible to minimize the influence from the hand movement.

In accordance with the above-mentioned principle of the present invention, when the shutter speed ($t_0$) is set as 16 ms (corresponding to 1/60 sec), for example, on the condition that M=6 and $\Delta t$=4 ms as mentioned above, $\Delta M$ and $n_1$ become as follows.

$$\Delta M = 16 ms / 4 ms = 4$$

$$n_1 = 6 - 4 + 1 = 3$$

Therefore, the time point $t_3$ in FIG. 3 is set as the exposure start point $t_{n1}$.

The total image movement amount l is represented as follows.

$$l = \sum_{n=n_1}^{6} l_n \tag{5}$$

$$= l_3 + l_4 + l_5 + l_6$$

On the other hand, when the shutter speed $T_o$ is 24 ms, $n_1$ becomes smaller than 1, and when the shutter speed $T_o$ is 28 ms, $n_1$ becomes equal to 0. Therefore, the exposure start range is uniformly set as $n_1 = 1$, while the exposure end range $n_2$ is determined by the following equation (6).

$$n_2 = M - (\Delta M - 6) + 1 \tag{6}$$

This is because since the number $\Delta M$ exceeds the number M, it becomes necessary to determine the address of amount $l_1 + l_6$ in each unit range of the quarter cycle so as to read out the image movement amount of the range where the number $\Delta M$ exceeds the number M from the memory.

More precisely, the amount l in the event that $\Delta M$ becomes larger than M is determined from the following equation (7).

$$l = \sum_{n=n_1}^{6} l_n + \sum_{n=n_2}^{6} l_n \tag{7}$$

The equation (7) is further explained below by way of numerical example.

When the shutter speed $T_o$ is 32 ms, it is arranged so that $n_1 = 1$ since $n_1 < 0$, and $n_2 = 5$ since $\Delta M = 8$. Therefore, since the exposure start range $n_1$ is set to be the range $a_1$ and the exposure end range $n_2$ is 5, the exposure process is performed in the period between the point $t_1$ and the point $t_8$. In this case, it is sufficient to read the amount data $l_1$ to $l_6$ and $l_5$ to $l_6$ from the memory since $l_7 = l_6$ and $l_8 = l_5$.

In that case, the total image movement amount l is represented as follows.

$$l = l_1 + l_2 + l_3 + l_4 + l_5 + l_6 + l_7 + l_8$$

In accordance with the above mentioned procedure, the amount l on the film surface is calculated with respect to each shutter speed and compared with the allowable amount.

When the amount l is larger than the allowable amount, the following procedure (A) or (B) is automatically carried out.

(A) For example, when the shutter speed $T_o$ is 16 ms, the shutter speed is shifted to a fast side by one step, i.e., to $T_o = 8$ ms (corresponding to 1/125 sec). A new amount $l = l_5 + l_6$ is calculated on the basis of the renewed shutter speed and compared again with the allowable amount.

The above mentioned process is repeated until the shutter speed $T_1$ is determined which speed satisfies the condition (amount $l \leqq$ allowable amount). The shutter is released at the shutter speed $T_1$.

(B) When the amount l is larger than the allowable amount as mentioned above, the speed $|V_f|$ is continuously detected and the exposure process is kept from starting until the next peak point $|t_p|$ is detected.

In accordance with the above-mentioned principle of the present invention, it becomes possible to avoid the blur of picture due to the hand movement at the time of photographing.

Figure 7:
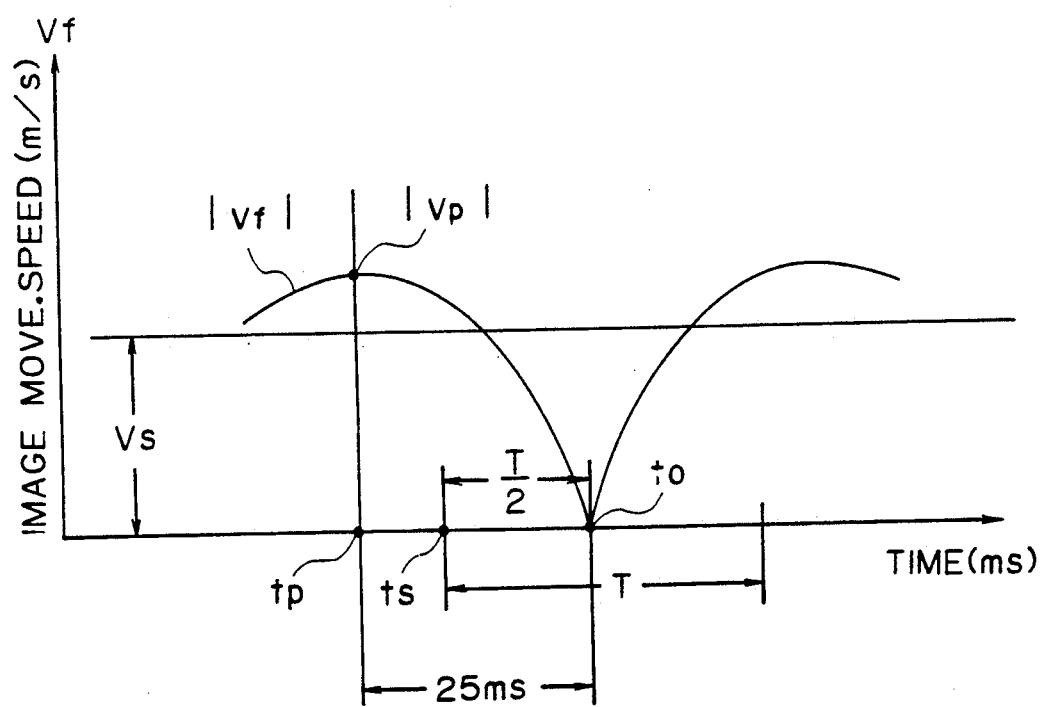
FIG. 7 is an explanatory view for explaining the principle of the function of the camera in accordance with the present invention represented in FIG. 6.

The principle of another example of the hand movement blur prevention mechanism in accordance with the present invention is described hereinafter with reference to FIG. 7.

In this example, as in the case of the preceding example, the speed change of the hand movement which causes the image movement on the film surface is assumed to be a single cycle of model vibration of 10 Hz frequency (amplitude thereof is inconstant). The image movement speed $|V_f|$ of the model vibration is regarded as the presumptive image movement speed on the film surface.

A reference timing point $t_o$ of the exposure timing with regard to all of the shutter speed is set at a point a quarter cycle after the peak point of $|V_f|$ is detected, that is a point 25 ms after the peak point $t_p$. The exposure timing of each shutter speed is set in such a way that the central point of the exposure timing band (ms) constituted from the shutter speed T is approximately coincident with the reference timing point $t_o$.

In this case, the model vibration is attenuated in the period of a quarter of the cycle from the peak point $t_p$ of $|V_f|$. Also, the speed $|V_f|$ is supposed to be almost symmetrical with respect to the zero point of the speed for the period of a quarter of the cycle on both sides of the zero point. Therefore, if the peak value $|V_p|$ of the speed $|V_f|$ is within the allowable amount, the speed $|V_f|$ at any point is below the allowable amount in the period of 50 ms between the first peak point $t_p$ and the second peak point.

Accordingly, by setting the exposure timing of all of the shutter speed T within the period of 50 ms, it becomes possible to avoid the unwanted image movement on the film surface, which makes it possible to effectively and reliably prevent the blur of picture caused by hand movement.

The total image movement amount l on the film surface is represented by $$l = \Sigma |V_{fi}| \times t \quad (8)$$

wherein t designates a constant sampling time for detecting the image movement speed and $|V_{fi}|$ designates the image movement speed in each sampling time.

Also, the amount l can be replaced by the speed $|V_f|$ from the relation between the speed $|V_f|$ and the shutter speed T since the speed $|V_f|$ is regarded as the single vibration of 10 Hz frequency.

As a result, it becomes possible to set the above-mentioned allowable amount as the allowable image movement speed Vs.

The allowable speed Vs changes according to the shutter speed T, therefore, the Vs is to be set corresponding to every shutter speed which is to be used.

On the other hand, in the ordinary photographing holding a camera by hands, blurring of picture caused by hand movement often occurs when the shutter speed T is not less than 40 ms. Therefore, in such a case, an arrangement is made so that the user is warned of hand blur by an alarm and/or the shutter is prohibited from releasing.

Under the assumption mentioned above, the principle of still another example of the mechanism for preventing hand movement blur in accordance with the present invention is derived as follows.

First, the set shutter speed $T_o$ is confirmed whether $T_o \geqq 40$ ms or not by an appropriate means. Only when $T_o < 40$ ms, the image speed $|V_f|$ is detected to find its peak value $|V_p|$ prior to releasing the shutter.

After detecting the value $|V_p|$ and its generation timing point $t_p$, the value $|V_p|$ is compared with the allowable image movement speed $V_{s-o}$ which is inherent to the set shutter speed. If $|V_p| < V_{s-o}$, the shutter is released at the set shutter speed $T_o$.

The exposure timing is determined so that the exposure start point $t_s$ for the shutter speed $T_o$ is at the point after a predetermined time which is dependent on the set shutter speed $T_o$ from the peak point $t_p$. That is, the start point $t_s$ is determined to be the point $$25 - (T_o/2) \text{ms}$$

after the peak point $t_p$.

On the other hand, in the event that $$|V_p| \geqq V_{s-o}.$$

the user can choose one of the following three procedures.

First, one of the procedures is to continue releasing the shutter as it is.

In that case, when the peak value $|V_p|$ of the image speed $|V_f|$ is detected, the peak value $|V_p|$ is again compared with the allowable image movement speed $V_{s-o}$. In the event that $$|V_p| < V_{s-o},$$

the exposure procedure is conducted after a predetermined time, as described later.

Second, another procedure for the user is to try again to release the shutter.

Third, still another procedure for the user is to change the shutter speed to a faster speed $T_1$. This procedure is taken when the condition $|V_p| < V_{s-o}$ is not obtained after trying several times or more.

That is, when the shutter speed is changed to a faster speed $T_1$, the allowable image speed $V_{s-1}$ for the speed $T_1$ becomes larger than the preceding allowable speed $V_{s-o}$, so that it becomes more likely to obtain the condition $$|V_p| < V_{s-1}.$$

In the event of $T \geqq 40$ ms, the user is warned of hand blurring by an alarm, as mentioned before.

Figure 1:
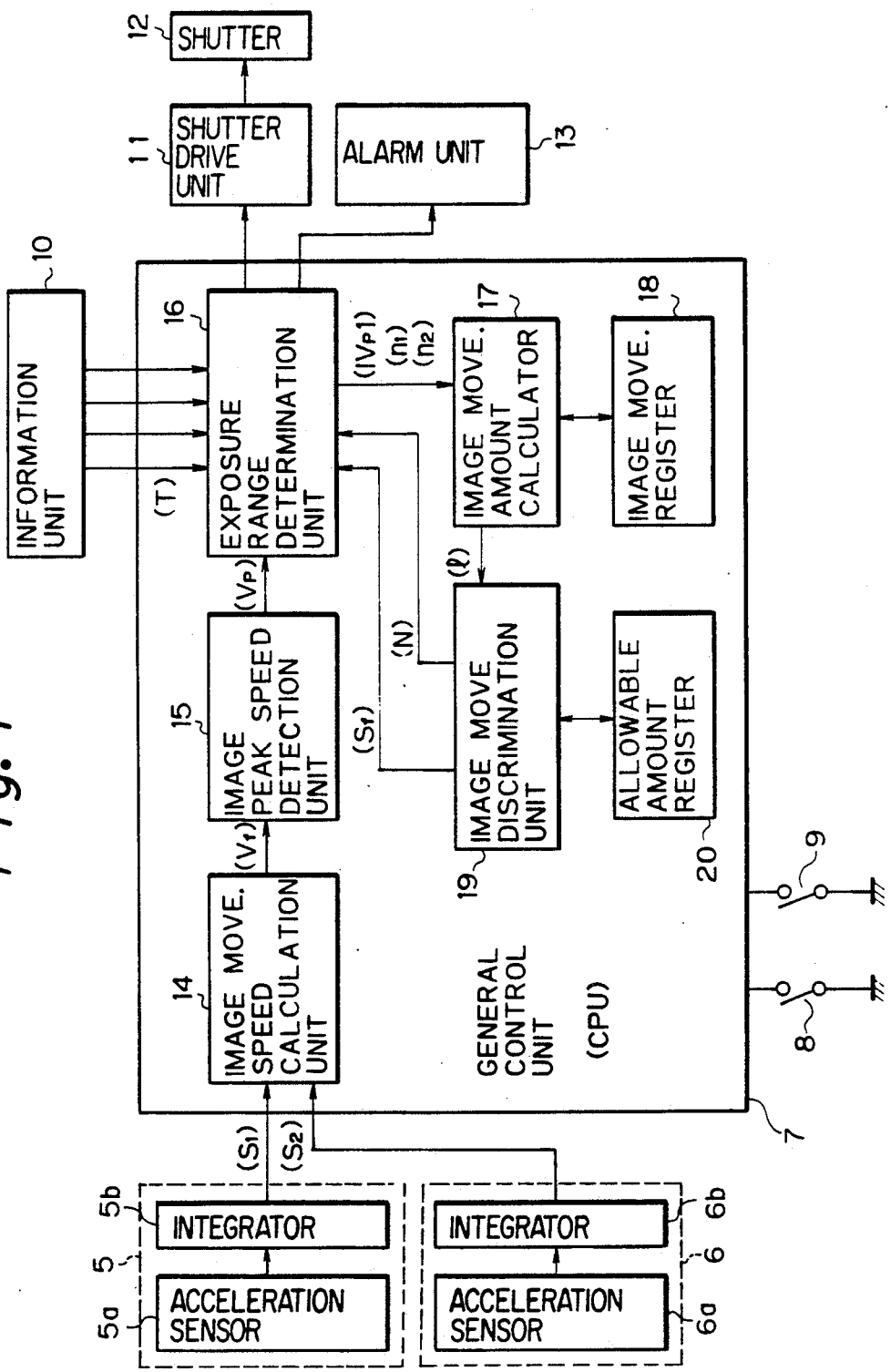
FIG. 1 is a block diagram of a whole structure of a camera with a function of preventing a hand moving blur of picture caused by hand movement in accordance with the present invention.
Figure 2:
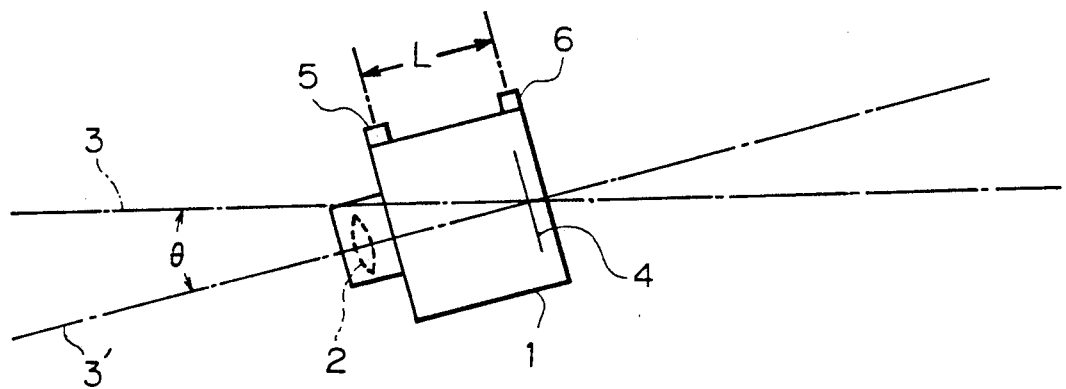
FIG. 2 is an explanatory view for explaining an example of layout of the acceleration sensors in accordance with the present invention.

FIG. 1 illustrates a block diagram of the whole structure of a camera with a function of preventing a hand moving blur in accordance with an embodiment of the present invention. FIG. 2 illustrates a layout of a pair of acceleration sensors in a camera of FIG. 1. FIG. 3 illustrates a graph which represents the principle of the present invention.

In the drawings are depicted a camera body 1 equipped with a function of preventing a hand moving blur of the present invention, a photographing lens 2, an optical axis 3 of the lens 2 in the normal state thereof, an optical axis 3' of the lens 2 in the state where the camera is inclined by a maximum angle θ caused by releasing the shutter and a film surface 4.

A pair of detectors 5 and 6 for detecting the speed of hand movement is disposed on the body 1 along the optical axis 3. The length between the detectors 5 and 6 is L as illustrated in FIG. 2. Each sensor 5, 6 is composed of, for example, a semiconductor acceleration sensor 5a, 6a and an acceleration integrator 5b, 6b connected to the sensor 5a, 6a, as illustrated in FIG. 1.

The integrators 5b and 6b are connected in parallel with each other to a general control unit (CPU) 7 which is described in detail later. Each of the integrators 5b and 6b receives an acceleration detection signal from the sensor 5a, 6a and changes the signal to a speed signal $S_1$, $S_2$ which is transmitted to the control unit 7.

It is to be noted that each integrator 5b, 6b is constituted as a circuit element having a filtering function which cuts the direct current component in the signal from the sensor 5a, 6a.

The control unit 7 is constituted from a microcomputer having appropriate functions such as a detecting function, a calculating function, a comparing function, a discriminating function and a memorizing function so as to control the whole system of the camera in accordance with the principle of the present invention.

A first step switch 8 and a second step switch 9, each being of open normal type, are connected to an input side of the control unit 7. The switches 8 and 9 are closed by a first step stroke and a second step stroke of the shutter release button (not shown), respectively.

Numeral 10 designates a various exposure information unit which outputs various exposure information such as luminous intensity information, diaphragm opening (aperture) information, film sensitivity information and manually operated shutter speed information, etc. The information unit 10 comprises an optical intensity measuring device for outputting luminous intensity information, a diaphragm mechanism for outputting diaphragm opening information, a DX contact for outputting film sensitivity information and a shutter speed setting mechanism for outputting shutter speed information.

Numeral 11 designates a shutter drive unit which opens and closes a shutter 12 in response to an exposure start signal and an exposure end signal, respectively, transmitted from the control unit 7.

Numeral 13 designates an alarm unit which, upon receipt of a hand movement signal from the control unit 7, acousticly or optically warns the user of the hand movement blur prior to manipulating the shutter or informs the user of the state in search of the exposure condition for avoiding the hand movement blur or that the picture taken latest is blurred.

The structure of the control unit 7 is described further in detail hereinafter.

Numeral 14 designates a calculation unit for calculating the speed of image movement. The unit 14 receives two signals $S_1$ and $S_2$ from the pair of detectors 5 and 6, respectively, and calculates the speed $|V_f|$ of the image movement on the film surface 4.

That is, the speed $|V_f|$ is calculated by the equation $$|V_f| = (f/L) \times |S_1 - S_2| \qquad (9)$$

wherein:

letter L designates the length between the sensors 5 and 6;

letter $S_1$ designates the speed value output from the detector 5; and letter $S_2$ designates the speed value output from the detector 6.

It is to be noted that the equation (9) is derived from a general formula $$f \times \tan \theta$$

for representing image movement amount on the film surface, wherein letter f designates the focal length of the lens 2.

Numeral 15 designates a detection unit for detecting the peak value of the image movement speed. Upon receipt of the speed signal Vf from the calculation unit 14, the detection unit 15 searches the peak value $|V_{p1}|$ of the signal Vf and the timing point $t_{p1}$ thereof as illustrated in FIG. 3 and outputs the detection signals of $|V_{p1}|$ and $t_{p1}$.

Numeral 16 designates an exposure range determination unit which determines an initial shutter speed ($T_o$) on the basis of the shutter speed information transmitted from the information unit 10, the shutter speed information being determined in the unit 10 on the basis of manually input shutter speed information or other information such as luminous intensity information, diaphragm opening information and film sensitivity information. The determination unit 16 also determines the first exposure start range $n_1$ which coincides with the first unit range $a_1$ in a quarter cycle period immediately after (1 ms after, in this particular embodiment) the timing point $t_{p1}$ of the peak value $|V_{p1}|$ detected by the unit 15.

Also, if an exposure start range shift signal $S_f$, which is described later, is not transmitted from an image movement discrimination unit 19, that is when the presumptive image movement amount l is smaller than the allowable movement amount, the determination unit 16 outputs an exposure start signal to the shutter drive unit 11 at the timing point $t_{n1}$ (in this embodiment, $t_1$) when the exposure start range $n_1$ comes and outputs an exposure end signal to the unit 11 at the timing point when the time period of the shutter speed ($T_o$) is passed.

On the other hand, the determination unit 16 shifts the exposure start range $n_1$ each time the signal $S_f$ is input thereinto until the condition represented by the equation (1) is satisfied when the exposure start range shifting function is stopped and the shutter speed is shifted to the higher side by predetermined steps (for example 0. 5 step). After shifting the shutter speed, the discrimination unit 19 compares again the amount l with the allowable amount. When the amount l becomes smaller than the allowable amount, the exposure start signal is output, as mentioned before.

Whereas, if the amount l is still larger than the allowable amount after repeating the shifting function for a predetermined number of times (for example three times), the speed $|V_f|$ is renewed so that the above-mentioned procedure is repeated.

Numeral 17 designates a calculation unit for calculating the amount of image movement. The calculation unit 17 calculates the presumptive image movement amounts $l_1$ to $l_6$ and the total movement amount l on the basis of the formulas represented in Table-1 mentioned before as functions of the peak value $|V_p|$ upon receipt of the peak value $|V_p|$ of the speed $|V_f|$. Note that the peak value $|V_p|$ represents the peak values $|V_{p1}|$, $|V_{p2}|$, etc. in general.

The amounts $l_1$ to $l_6$ of the ranges $a_1$ to $a_6$ calculated as mentioned above are registered in the memory addresses $M_1$ to $M_6$ of a presumptive image movement amount register unit 18, respectively. Also, the presumptive image movement amounts $l_7$ to $l_{12}$ of the unit range $a_7$ to $a_{12}$ which are the same as $l_6$ to $l_1$, respectively, are registered in memory addresses $M_7$ to $M_{12}$, respectively.

Also, the calculation unit 17 receives information about the ranges $n_1$ and $n_2$ from the unit 16 and calculates the amount l on the basis of the equation (2) using the necessary data of the amounts $l_1$ to $l_6$ read from the register unit 18. The calculated amount l is transmitted to the discrimination unit 19.

Upon receipt of the amount data l, the discrimination unit 19 compares the amount l with the allowable amount (for example, an amount smaller than the diameter 35 μm of the minimum confusion circle) which is registered in advance in an allowable image movement amount register unit 20.

If the amount l is smaller than the allowable amount, a signal is transmitted to the determination unit 16 so that the exposure is conducted on the condition now on set.

On the other hand, if the amount l is larger than the allowable amount, an exposure start range shift signal $S_f$ is transmitted to unit 16 so that the exposure start range $n_1$ is changed from the first unit range $a_1$ of the quarter cycle period to, for example, the second range $a_2$ which is arranged in the retard side by one unit from the range $a_1$.

Another embodiment of the present invention is described referring mainly to the points which are different from the above-mentioned embodiment.

In this embodiment, the determination unit 16 determines the shutter speed ($T_o$) from the shutter speed information which is determined by the information unit 10 on the basis of manually input information or other information such as luminous intensity information, diaphragm opening information and film sensitivity information. The unit 16 also calculates, in this embodiment, the time period from the point $t_{p1}$ of the peak value $|V_{p1}|$ detected by the detection unit 15 to the starting point of the exposure so that the time period is represented by the number of ranges to be retarded. More particularly, the unit 16 calculates the range $n_1$ on the basis of the equation (4) mentioned before.

If either a shutte speed shift signal $S_f$, described later, or an exposure start prohibition signal N is not input to the unit 16, the unit 16 output an exposure start signal to the drive unit 11 at the point when the range $n_1$ comes. The unit 16 also outputs an exposure end signal to the unit 11 at the point when the above-mentioned shutter speed ($T_o$) is passed.

The calculation unit 17 receives information of the range $n_1$ and in some cases also the range $n_2$ from the unit 16. The unit 17 also calculates the total image movement amount l on the basis of the equation (5) or (7) using the necessary data of the amount $l_1$ to $l_6$ read from the regiser unit 18 and transmit the data of the amount l to the discrimination unit 19.

Upon receipt of the amount l data, the unit 19 compares the amount l with an allowable amount (for example, an amount smaller than the diameter 35 μm of the minimum confusion circle) which is registered in advance in the allowable image movement amount register unit 20.

If the amount l is smaller than the allowable amount, the unit 19 transmits a signal to the determination unit 16 so that the exposure is conducted on the condition now being set.

On the other hand, if the amount l is larger than the allowable amount, the unit 19 outputs a shutter speed shift signal $S_f$ to the unit 16 so that the shutter speed is changed from $T_o$ which is previously set or determined to a new shutter speed faster by one step, for example. Or otherwise, the unit 19 outputs an exposure start prohibition signal N.

The function of the first embodiment of the present invention constructed as mentioned before is described hereinafter with reference to the flow chart of FIG. 4.

First, the release button is pressed for a first stroke to turn on the first switch 8 (step S1).

Second, if the user has present a desired shutter speed by manual operation, the preset shutter speed $T_o$ is taken into the determination unit 16 along with the other inforamation output from the inforamtion unit 10 so that the unit 16 calculates and determines an appropriate diaphragm opening value to obtain a proper exposure amount (step S2).

After that, the release button is pressed to a second stroke level to turn on the second switch 9 (step S3). By this manipulation, the hand movement (image movement) prediction procedure begins.

F and ΔTv are set as F←0 and ΔTv←0.5 wherein F and ΔTv are factors for limiting the shifting amount of the shutter speed when the image movement amount is large so that the shutter speed is to be shifted. In this particular embodiment, the shutter speed shifting procedure is arranged in such a way that the shutter speed is changed three times (F=3) by every ΔTv=0.5 step, i.e., total 1.5 steps (step S4).

The calculation unit 14 samples the signals $S_1$ and $S_2$ output from the detectors 5 and 6 in order in every predetermined sampling time and calculates the speed $|V_f|$ from the following equation (step S5).

$$|V_f| = (f/L)|S_1 - S_2| \qquad (9)$$

The data signal of $|V_f|$ is transmitted to the detection unit 15 which repeats the detection procedure until the peak value $|V_p|$ is detected (step S6 route NO).

When the peak value $|V_p|$ is detected (step S6 route YES), the determination unit 16 processes so that the initially set shutter speed is substituted for the shutter speeds $T_1$ and $T_v$ which are to be actually used for exposure (step S7). The unit 16 also calculates ΔM from the following equation (step S8).

$$\Delta M = (\text{shutter speed } T_1)/(\text{unit time width } \Delta t)$$

On the other hand, upon receipt of the peak value $|V_p|$ data, the calculation unit 17 calculates the amounts $l_1$ to $l_6$ of the range $a_1$ to $a_6$, respectively, on the basis of the formulas represented in the above-mentioned Table-1. The data of the amounts $l_1$ to $l_6$ are registered in the predetermined memory addresses $M_1$ to $M_6$ of the register unit 18, respectively. Also, as represented in Table-1, the data of $l_6$ to $l_1$ are registered in the memory addressed $M_7$ to $M_{12}$ of the unit 18 (step S9).

After that, the unit 16 sets the range $a_1$ as the initial exposure start range $n_1$ and determines the exposure end range $n_2$ by substituting ΔM for the equation (3) mentioned before (steps S10).

After the determination of the exposure range (period), as mentioned above, the unit 17 calculates the amount l in the exposure range from the equation (2). For example, in the event that the shutter speed $T_o = 16$ ms, it becomes $n_1 = 1$ and $\Delta M = 4$, resulting $n_2 = 4$. Therefore, the amount l is represented by $$l = \sum_{n=n_1}^{n_2} M_n = l_1 + l_2 + l_3 + l_4$$

The unit 17 calculates the sum amount l using the data of $l_1$ to $l_4$ memorized in the addresses $M_1$ to $M_4$, respectively (step S11).

The amount l data is transmitted to the unit 19 where the amount l is compared with the allowable amount read from the register unit 20 (step S12).

When the amount l is equal to or smaller than the allowable amount, the unit 19 discriminates that the image blur due to the hand movement is negligible to the photograph and transmits that information to the determination unit 16 (step S12 route YES).

The unit 16 outputs an exposure start signal to the driven unit 11 at the timing point $t_1$ so that the shutter 12 is opened and an exposure process is conducted under the initially set conditions of shutter speed and diaphragm opening. Also, the unit 16 outputs an exposure end signal to the unit 11 at the time point $t_{n2}$ when the exposure end range $n_2$ comes so that the shutter 12 is closed (step S13).

On the other hand, when the unit 19 discriminates that the amount l is larger than the allowable amount (step S12 route NO), the photograph becomes blurred due to the hand movement. To about this blurring, the unit 19 outputs an exposure start range shift signal $S_f$ to the unit 16 so as to retard the starting range $n_1$ by, for example, one unit range. Upon receipt of the signal $S_f$, the unit 16 shifts first the exposure end range $n_2$ to the retard side by one unit range (step S14).

After that, the amount l in the shifted renewal exposure period is calculated by the following equation (step S15).

$$l = l_f - l_{n1} + l_{n2}$$

wherein $l_f$ designates the previous presumptive image movement amount and $l_{n1}$ designates the presumptive image movement amount of the previous exposure start range and wherein $l_{n2}$ designates the presumptive image movement amount of the renewed exposure end range.

The unit 19 compares the amount l of the shifted exposure period $a_{n1}$ to $a_{n2}$ with the allowable amount (step S16).

If the amount l is smaller than the allowable amount (step 16 route YES), the exposure process is conducted in accordance with the shifted timing (step S13).

On the other hand, if the amount l is still larger than the allowable amount, one of the following two procedures is carried out. (A)

In the event that the relation between the half cycle period number M (in this particular example, M=6) and the exposure range number $\Delta M$ satisfies the equation $$n_1 \leq M - (\Delta M/2) \qquad (1)$$

the range $n_1$ is shifted by one unit range since the amount l can be reduced by shifting the range $n_1$ to the retard side (step S18). This shifting procedure is repeated until the amount l becomes smaller than the allowable amount when the process goes to the step S13 (step S16 route YES). (B)

On the other had, in the event that the relation $$n_1 > M - (\Delta M/2)$$

is satisfied in the shifting procedure, the unit 16 stops the procedure for shifting the exposure start range and moves on instead to the shutter speed shifting process mentioned before (step S19).

In this particular example, the shutter speed is shifted to the high speed side by every 0.5 step (0.5 Ev) and the amount l is compared with the allowable amount after each shifting step.

If the amount l does not become smaller than the allowable amount after three times of the shifting step, the shutter speed shifting procedure is stopped (step S21).

After that, when a predetermined waiting time (for example, 10 ms) has passed (step S22), the process for detecting the peak value $|V_p|$ is carried out again. If the amount l becomes smaller than the allowable amount by this process, the exposure process is conducted (step S13).

In accordance with the above-mentioned embodiment of the present invention, the following advantages can be obtained.

First, the shutter timing of the user's intention has priority, which makes it possible to reduce the possibility of missing the chance of releasing the shutter.

Second, in the event that the image is blurred on the condition of initially set shutter timing, the shutter timing is retarded in such a way that the shutter timing is shifted to the retard side by predetermined time width ($\Delta t$) with respect to the peak value of the image movement single vibration, that the image movement amount is discriminated each time the shutter speed is shifted and that the exposure is started when the image movement amount becomes smaller than the allowable amount, which makes it possible to take a photograph without blurring on the possible closest condition of the user's intention.

Also, in the event that it is discriminated that the hand blurring occurs even after shifting the shutter timing (exposure start timing) to a predetermined point, the shutter speed is shifted to the high speed side step by step and the discriminated process is repeated in every step, which makes it possible to reduce the image movement amount smaller than the minimum circle of confusion and reliably avoid the hand blur of the photograph.

Also, in accordance with the embodiment of the present invention, semiconductor acceleration sensors 5a and 5b are used for detecting the movement speed (or directly acceleration) of the hand holding the camera, which results in the following advantages.

First, it becomes possible to detect a minute vibration less than 1 G.

Second, it becomes possible to detect vibrations in many directions.

Third, irregular vibrations occurring in various directions can be detected effectively.

Fourth, in the process of producing the sensor, it is possible to arrange an amplifier and a temperature compensation device or other functional circuits on the same silicon chip, it becomes possible to make the structure of the camera compact and light.

Fifth, the sensor is produced according to the Si process, which makes it possible to reduce the cost of the camera which is produced through a mass production process.

The present invention is not limited to the embodiments mentioned above but can be modified within the scope of the invention.

Figure 4:
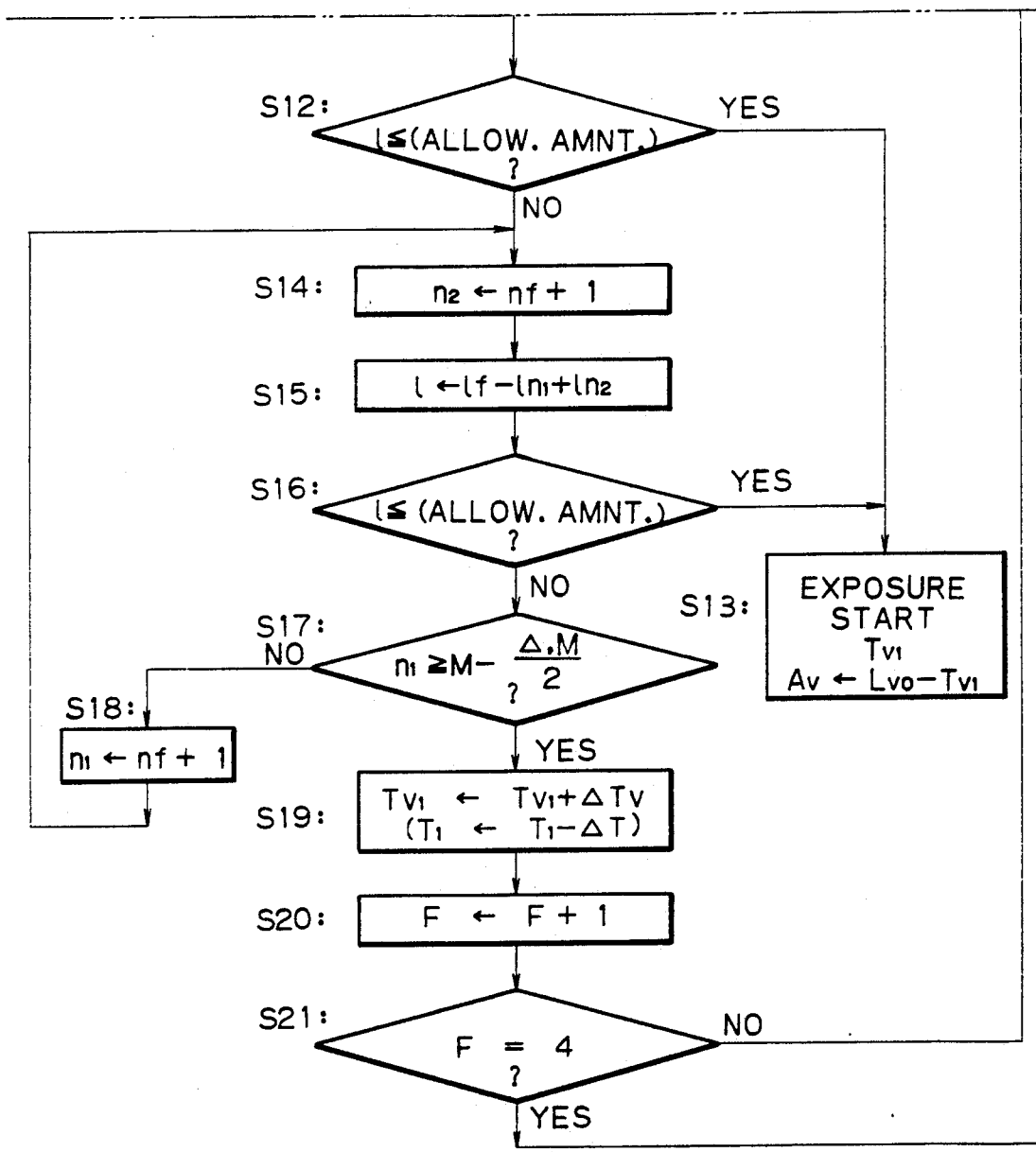
FIG. 4 is a flow chart for explaining an example of the functional sequence of the camera with a function of preventing a hand moving blur caused by hand movement in accordance with the present invention.

For example, refering to the flow chart of FIG. 4, in steps S12 and S16, in the event that the amount l is discriminated to be larger than the allowable amount, information may be transmitted to the alarm unit 13, information including that the hand movement is discriminated to be large enough to cause blurring of the picture, that the process for shifting the exposure start timing or shutter speed is being conducted, that the shutter is prevented from being released to avoid hand blurring, and the alarm unit 13 may display those information by optic means or acoustic means.

Also, the frequency of the model vibration is not limited to 10 Hz and the time width $\Delta t$ is not limited to 4 ms, as in the particular case of the embodiment mentioned above.

Also, the detection means for detecting the peak value of the image movement speed and the generation timing point thereof and the calculation means for calculating the presumptive image movement amount in the first six unit ranges are not limited to those exemplified in the description mentioned above.

Also, the initial exposure start timing is not necessarily arranged to be the first unit range as in the case of the particular embodiment mentioned above but can be changed to an appropriate range.

The function of the second embodiment of the present invention is described hereinafter with reference to the flow chart of FIG. 5.

First, the release button is pressed for a first stroke to turn on the first switch 8 (step S1).

Second, if the user has preset a desired shutter speed by manual operation, the preset shutter speed $T_o$ is taken into the determination unit 16 along with the other information output from the information unit 10 so that the unit 16 calculates and determines an appropriate diaphragm opening value to obtain a proper exposure amount (step S2).

After that, the release button is pressed to a second stroke level to turn on the second switch 9 (step S3).

The calculation unit 14 samples the speed signals $S_1$ and $S_2$ output from the sensors 5 and 6 in series in every predetermined sampling time period and calculates the image movement speed $|V_f|$ by the following equation (step S4).

$$|V_f| = (f/L) \cdot |S_1 - S_2|$$

The detection unit 15 continues to detect the speed $|V_f|$ until its peak value $|V_p|$ is detected. When the peak value $|V_p|$ is detected (step S5 route YES), the value is input to the determination unit 16 which calculates the presumptive image movement amounts $l_1$ to $l_6$ of the ranges $a_1$ to $a_6$, respectively, on the basis of the formula represented in Table-1 mentioned before. The calculated amounts $l_1$ to $l_6$ are registered in the predetermined memory addresses $M_1$ to $M_6$ of the presumptive image movement amount register unit 18, respectively (step S6).

After that, the unit 16 sets the shutter speed $T_1$ to be an initial shutter speed $T_o$ (step S7).

The unit 16 also calculates the exposure range number $\Delta M$ by the following equation (step S8).

$$\Delta M = (\text{shutter speed } T_o)/(\text{unit time width})$$

Further, in step S9, the unit 16 calculates the exposure start range $n_1$ from the above-mentioned equation (4), that is, $$n_1 = M - \Delta M + 1.$$

After that, in the event that $n_1$ is larger than zero ($n_1 > 0$), the procedure flow moves on to step S11 (step S10 route NO) in which the calculation unit 17 calculates the total image movement amount l from the above-mentioned equation (5). For example, in the event that the shutter speed $T_o = 16$ ms, resulting that $\Delta M = 4$ and $n_1 = 3$, the amount l is represented as $$l = l_3 + l_4 + l_5 + l_6.$$

On the other hand, in the event that the range $n_1$ is not larger than zero ($n_1 \leq 0$), the unit 16 sets the range $n_1$ as $n_1 = 1$ and calculates the exposure end range $n_2$ from the above-mentioned equation (6) (step S12).

The unit 17 calculates the amount l from the above-mentioned equation (7) on the basis of the data of $n_1$ and $n_2$ obtained from the unit 16 (step S13).

The data of l is transmitted to the discrimination unit 19 which compares the amount l with the allowable amount read from the register unit 20 (step S14).

In the event that the amount l is smaller than the allowable amount, the image blur due to the hand movement is discriminated to be negligible in the photograph. Information of the result of discrimination is transmitted to the determination unit 16 (step S14 route NO).

Upon receipt of that information from the unit 19, the unit 16 outputs an exposure start signal to the shutter drive unit 11 at the time point $t_{n1}$ to open the shutter 12 on the initially set exposure condition on the shutter speed and the diaphragm opening. The unit 16 also outputs an exposure end signal to the drive unit 11 at the time point $t_7$ when the image movement speed becomes zero to close the shutter 12 (step S15).

On the other hand, in the event that the unit 19 discriminates the amount l to be larger than the allowable amount (step S14 route YES), the hand movement causes blur to the photograph. Therefore, to avoid the blurring of the photograph, a shutter speed shift signal is transmitted to the determination unit 16 so as to shift the shutter speed to the higher speed side by, for example, one step. Upon receipt of the shift signal, the unit 16 shortens the shutter speed (shutter opening time) to half of the preset shutter speed (step S16).

After that, the flow of the procedure moves back to step S8 for calculating the number $\Delta M$ and repeats the above mentioned steps until the amount l becomes smaller than the allowable amount.

Also, in the event that the amount l is larger than the allowable amount, an exposure start prohibition signal may be transmitted to the unit 16 to prohibit an exposure process from being carried out instead of shifting the shutter speed as mentioned above (step S17). In this event, the flow of the procedure moves back to step S4 for defecting the image movement speed $|V_f|$ and repeats the above-mentioned steps until the amount l becomes smaller than the allowable amount when the exposure process is started (step S15).

As mentioned above, in accordance with the embodiment described with reference to FIG. 5, it becomes possible to reliably and automatically carry out the exposure operation in the allowable time range for preventing the hand movement blur on the shutter speed condition of the user's intention or the possible closest condition to the user's intention, which enables to effectively and reliably avoid image blur on the film surface caused by hand movement without much departing from the user's intention.

That is, with regard to the exposure timing, in the event that $\Delta M$ is smaller than M, the exposure process is carried out in such a way that the exposure is ended at the timing when the image speed $|V_f|$ becomes zero, which results in that the photographing procedure is carried out in the time period in which the image movement speed is minimized as much as possible. Therefore, it becomes possible to enlarge the possibility of photographing within the allowable range of image movement amount on the film surface at the time of the exposure process.

Also, when it is discriminated that the hand blur occurs on the shutter speed condition initially set or selected, the shutter speed is shifted to the higher speed side step by step and the possibility of hand blur occurrence is repeatedly discriminated in every step, which makes it possible to reduce the image movement amount within the minimum circle of confusion and reliably obtain a photograph free from hand blur.

Further, due to the arrangement that in the event that the presumptive image movement amount is larger than the allowable amount, the exposure process is prohibited from being carried out and that the exposure is started only when the hand movement is attenuated, the hand blur of the picture is reliably obviated.

The above-mentioned embodiment of the present invention can be further modified in various manners without departing from the scope of the invention.

Figure 5:
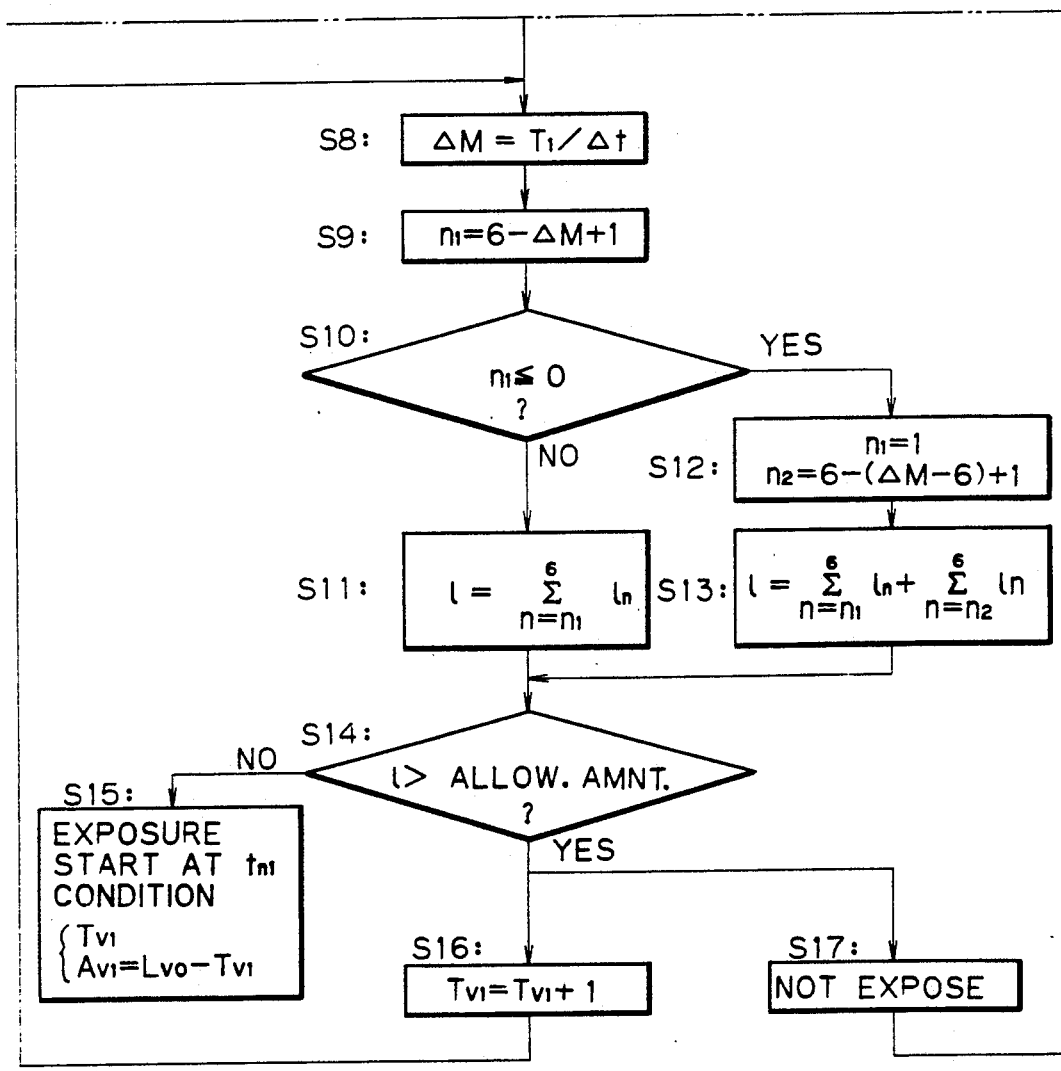
FIG. 5 is a flow chart for explaining another example of the functional sequence of the camera with a function of preventing a hand moving blur caused by hand movement in accordance with the present invention.

For example, in step S14 of the flow chart of FIG. 5, in the event that the amount l is discriminated to be larger than the allowable amount, information may be transmitted to the alarm unit 13, information including that the amount l is discriminated to cause the hand movement blur of the picture, that the camera mechanism is being in the state of shifting the shutter speed, and that the shutter is prevented from being released to avoid hand blurring, so that the alarm unit 13 displays each information acoustically or optically.

Also, the exposure start point of the exposure period may be set at any appropriate point other than the exemplified point of the above-mentioned embodiment.

Also, the exposure end point does not necessarily have to strictly coincide with the zero point of the image movement speed.

It is also to be noted that the time width $\Delta t$ of the unit ranges $a_1$ to $a_{12}$ is desirably set in a short time as possible but does not necessarily have to be even. For example, the range in the vicinity of the zero point of the image speed may be arranged longer than the other ranges.

Figure 8:
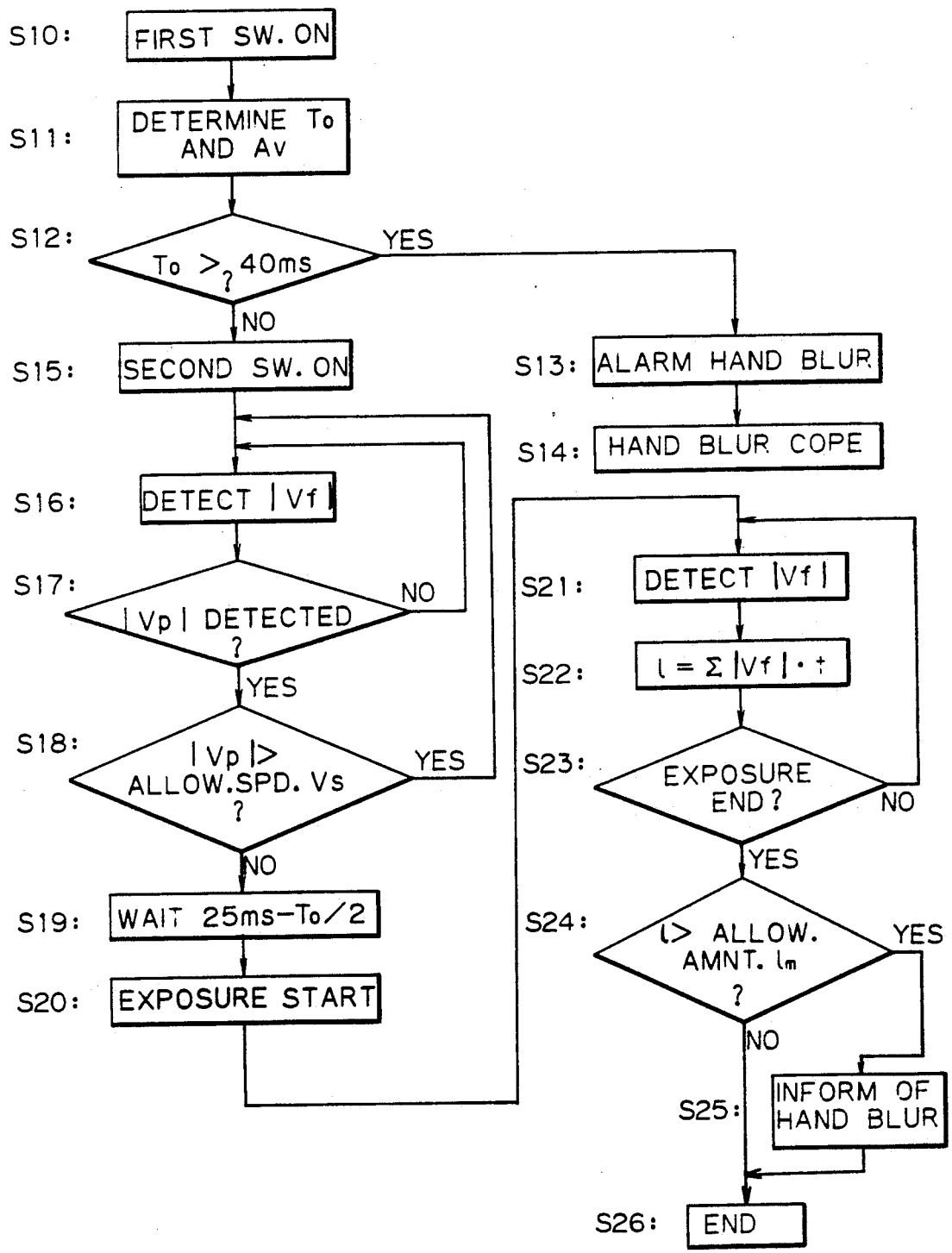
FIG. 8 is a flow chart representing the functional sequence of the camera of FIG. 6.

Another embodiment of the present invention is described hereinafter with reference to FIGS. 6 to 8.

The acceleration sensor (hand movement speed detector) used in this embodiment is the same as that illustrated in FIG. 2. Therefore, the construction and function thereof are not reexplained here.

Also, other portions which are the same as those of the embodiment of FIGS. 1 to 4 are not described in detail here.

Figure 6:
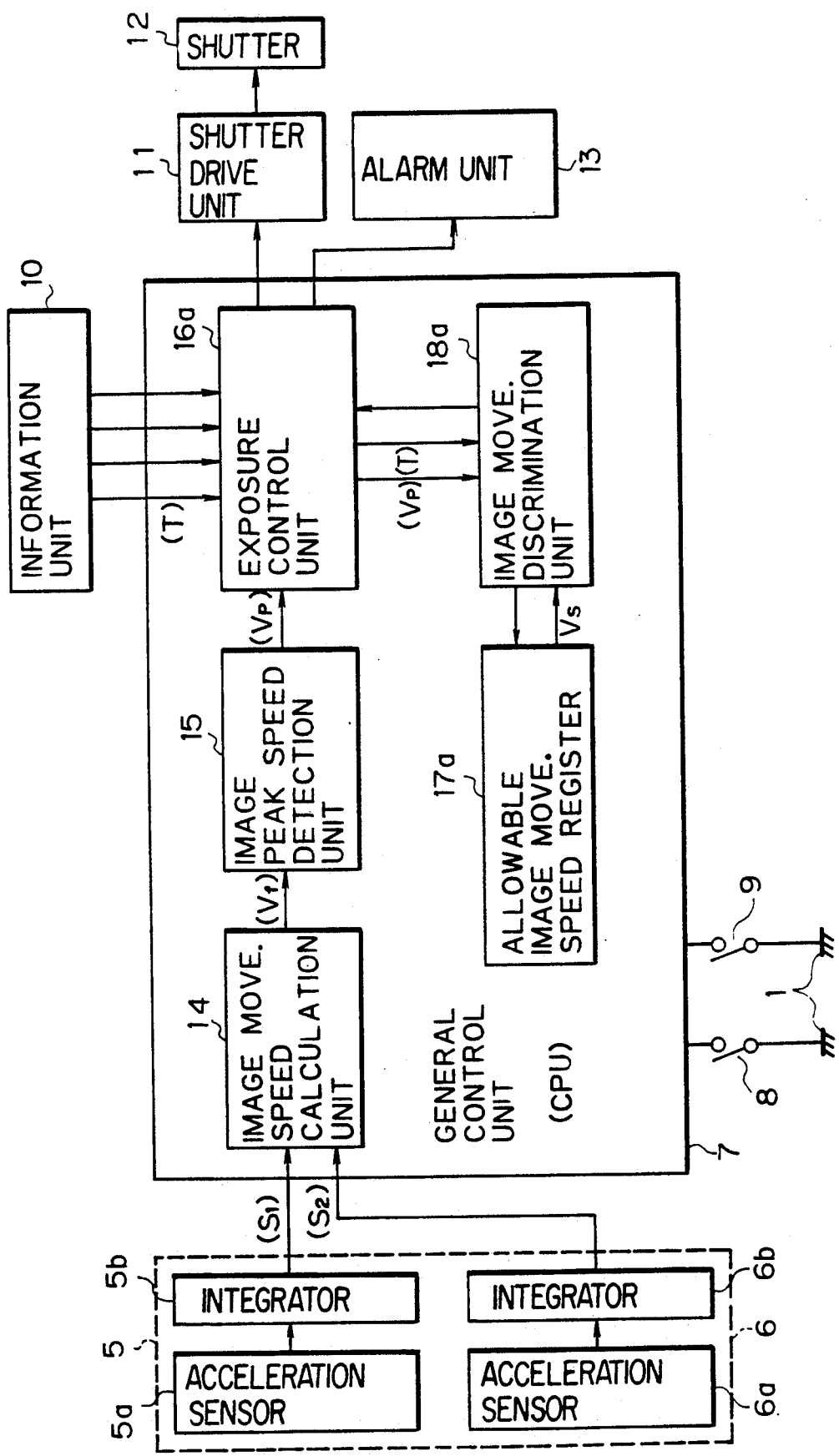
FIG. 6 is a block diagram of another example of the whole structure of the camera with a function of preventing a hand moving blur caused by hand movement in accordance with the present invention.

In FIG. 6, 16a designates an exposure control unit which determines the shutter speed (T) from the shutter speed information output from the information unit 10 and determined on the basis of the manually input shutter speed information or other information such as luminous intensity information, diaphragm opening (aperture) information and film sensitivity information. The control unit 16a also calculates the retard time represented as $(25 - T/2)$ ms on the basis of timing point (tp) of the image speed peak detected by the detector unit 15.

The unit 16a outputs an exposure start signal to the shutter drive unit 11 at the timing when the retard time $(25 - T/2)$ has passed. Also, the unit 16a outputs an exposure end signal to the drive unit 11 at the timing point when the shutter speed (T) is passed which shutter speed is set by the information unit 10 or calculated on the basis of various exposure information output from the information unit 10.

Numeral 17a designates a register unit which memorizes in advance the allowable image movement speed $V_s$ which is determined in response to the shutter speed as mentioned above.

Numeral 18a designates an image movement discrimination unit which receives data of the peak value $|V_p|$ of the image movement speed and the shutter speed (T) from the control unit 16a. Upon receipt of the data signal from the unit 16a, the discrimination unit 18a reads the allowable data signal $V_s$ in response to the shutter speed (T) from the register unit 17a and compares the peak value $|V_p|$ with the allowable speed $|V_s|$. If the peak value $|V_p|$ is larger than the allowable speed $V_s$, the exposure start allowance signal is not output to the control unit 16a.

The function of the above-mentioned embodiment of the present invention is described hereinafter with reference to the flow chart of FIG. 8.

First, the release button is pressed for a first stroke to turn on the first step switch 8 (step S10).

In the event that the user manually preset the shutter speed as desired, the shutter speed $T_o$ is taken into the control unit 16a along with the other exposure condition data output from the information unit 10 and an appropriate diaphragm opening is calculated for conducting a proper exposure process (step S11).

After that, the control unit 16a discriminates whether the shutter speed $T_o$ is more than 40 ms or not. If the shutter speed (shutter opening period) is more than 40 ms, an alarm signal warning of hand blur is output (step S12).

Upon receipt of the alarm signal, the alarm unit 13 generates a luminous alarm or sound alarm by means of light emitting element or acoustic element (step S13). The alarm unit 13 also conducts a procedaure for avoiding the hand blur photographing such as invalidating the movement of the second step switch 9 or locking the release button (step S14).

On the other hand, when the preset shutter speed $T_o$ is shorter than 40 ms, the flow of procedure moves on to step S15 (step S12 route NO).

In step S15, the release button is pressed down to the second stroke level so that the second switch 9 is turned on.

When the switch 9 is turned on, the calculation unit 14 samples the speed signals, $S_1$ and $S_2$ output from the pair of detectors 5 and 6 in series in every predetermined sampling time (t) and calculates the image movement speed $|V_f|$ from the following equation (step S16). $|V_f| = (f/L) \cdot |S_1-S_2|$ The data signal of the image movement speed $|V_f|$ is transmitted from the unit 14 to the detection unit 15. The unit 15 searches the speed data $|V_f|$ until its peak value $|V_p|$ is detected (step S17).

When the peak value $|V_p|$ is detected (step S17 route YES), the procedure flow moves on to step S18 in which the discrimination unit 18a reads the allowable image movement speed $V_s$ in response to the shutter speed $T_o$ from the register unit 17a and compares the data of $|V_p|$ with the allowable speed $V_s$.

If the peak value $|V_p|$ is larger than the allowable speed $V_s$, the procedure flow moves back to step S16 (step S18 route YES) and repeats the detection process until detecting the peak value $|V_p|$ which is smaller than $V_s$.

If the peak value $|V_p|$ is smaller than $V_s$ (step S18 route NO), the control unit 16a calculates the retard time (or waiting time) from the formula $(25-T_o/2)$ ms and outputs an exposure start signal to the shutter drive unit 11 at a timing point $t_s$ when the retard time is passed after the timing point tp of the peak value $|V_p|$ (steps S19 and S20).

Upon receipt of the exposure start signal, the drive unit 11 opens the shutter 12 to start the exposure process (step S20).

After that, the image movement speed $|V_f|$ is again detected (step S21).

The calculation means which is not illustrated samples the image speed $|V_f|$ in every sampling time from the exposure start point ts to the exposure end point and calculates the total image movement amount l as the sum of the value of the every image speed $|V_f|$ multiplied by the sampling time t, that is on the basis of the following calculation formula (step S22).

$$l = \Sigma |V_f| \times t$$

When the exposure process is ended (step S23), the actual image movement amount l is measured. The actual amount l is compared to the allowable image movement amount l m which is determined from the shutter speed (T) by an image movement amount discrimination means (not shown) (step S24).

If l>l m, the photograph is blurred beyond the allowable limit. The user is informed of this state of blurring of the picture now taken by an informing means (not shown) (step S25).

If l<l m, the photograph is not blurred or blurring is within the allowable limit. Therefore, the photographing process is ended without informing the state of blurring to the user (step S26).

In accordance with the above-mentioned embodiment of the present invention, the image movement speed $|V_f|$ due to hand movement is assumed as a model vibration of 10 Hz, wherein if the shutter speed T is smaller than 40 ms, the image speed $|V_f|$ is searched according to the model vibration to detect the peak $|V_p|$ and the timing point tp thereof. The peak value $|V_p|$ is compared with the allowable image speed $V_s$ which is related to the shutter speed $T_o$ now being set. While on the other hand, the timing poing about 25 ms after the point tp of the peak $|V_p|$ is arranged to coincide with the central point of the exposure period determined by the shutter speed so that the image speed $|V_f|$ is controlled to become small so as to automatically reduce the image movement on the film surface to be less than the allowable limit, which makes it possible to realize a camera with a function of preventing a hand moving blur which is very simple and solid in construction.

Also, due to the arrangement of the alarm unit 13 or the hand blur informing means, it becomes possible to inform the user of the state that it is necessary to change the shutter speed whereby the user's intention can be taken into consideration to determine the exposure condition.

It is to be noted that the present invention is not limited to the shutter priority type camera but can be applied to the aperture priority type camera or the camera of program setting type or manual setting type.

Many widely different embodiments of the present invention may be constructed without departing from the spirit and scope of the present invention. It should be understood that the present invention is not limited to the specific embodiments described in the specification except as defined in the appended claims.

What is claimed is:

1. A camera with a function of preventing a hand moving blur, comprising:
   a first detecting means attached to a camera body for detecting a hand moving speed of the camera;
   a converting means for converting the detected hand moving speed into an image moving speed on a film surface;
   a second detecting means for detecting a peak speed of the converted image moving speed and for detecting a peak time at which the peak speed is detected; and
   a calculating means for calculating a presumptive image moving speed after the peak time on the basis of the peak speed and the peak time, and for calculating quantitatively a presumptive image moving quantity after the peak time based on the presumptive image moving speed and a passing time period from the peak time, thereby to decide an exposure time period.

2. A camera according to claim 1, wherein the calculating means is adapted to calculate the presumptive image moving speed and the presumptive image moving quantity on an assumption that the image moving speed is a single vibration having a predetermined frequency and an amplitude of the peak speed.

3. A camera according to claim 1, wherein the camera further comprises a comparing means for comparing the presumptive image moving quantity on a perdetermined exposure time period with a predetermined allowable image moving quantity, and a deciding means for deciding to shorten a shutter speed in a case where the presumptive image moving quantity is greater than the allowable image moving quantity.

4. A camera according to claim 1, wherein the camera further comprises a comparing means for comparing the presumptive image moving quantity on a predetermined exposure time period with a predetermined allowable image moving quantity, and a deciding means for deciding to change the exposure time period in a case where the presumptive image moving quantity is greater than the allowable image moving quantity.

5. A camera according to claim 1, wherein the camera further comprises a comparing means for comparing the presumptive image moving quantity on a predetermined exposure time period with a predetermined allowable image moving quantity, and a deciding means for deciding to prohibit a shutter from releasing.

6. A camera according to claim 2, wherein the predetermined frequency is approximately 10 hertz.

7. A camera according to claim 1, wherein the calculating means is adapted to divide at predetermined time periods in time series the presumptive image moving quantity after the peak time into a plurality of unit ranges and calculate respective presumptive image moving quantities of the unit ranges based on the peak speed and the passing time period from the peak time.

8. A camera according to claim 7, wherein the calculating means is adapted to calculate the presumptive image moving quantity by summing up the presumptive image moving quantities of the unit ranges included in a predetermined exposure time period.

9. A camera according to claim 1, wherein the camera further comprises a deciding means for deciding an exposure starting timing after a predetermined time period from the peak time, the predetermined time period depending on the exposure time period.

10. A camera according to claim 9, wherein the predetermined time period is about (25-T/2) milliseconds, wherein T designates the exposure time period.

11. A camera according to claim 9, wherein the deciding means is adapted to shorten a set shutter speed in a case where the peak speed is greater than a predetermined allowable image moving speed.

12. A camera according to claim 9, wherein the deciding means is adapted to prohibit a shutter from releasing in a case where the peak speed is greater than a predetermined allowable image moving speed.

13. A camera according to claim 4, wherein the deciding means is adapted to shift in order an exposure starting timing on a time period after the peak time in such a manner that the presumptive image moving quantity of the shifted exposure time period is not greater than the predetermined allowable image moving quantity.

* * * * *